United States Patent [19]
Mainord

[11] Patent Number: 4,613,679
[45] Date of Patent: Sep. 23, 1986

[54] EMULSIFIABLE MODIFIED POLYMERS

[75] Inventor: Kenneth R. Mainord, Longview, Tex.

[73] Assignee: Eastman Kodak Company, Rochester, N.Y.

[21] Appl. No.: 75,358

[22] Filed: Sep. 13, 1979

Related U.S. Application Data

[63] Continuation of Ser. No. 820,958, Aug. 1, 1977, abandoned.

[51] Int. Cl.$^4$ .............................................. C07C 69/60
[52] U.S. Cl. ................................. 560/190; 428/523; 526/324; 560/202
[58] Field of Search ........................................ 560/190

[56] References Cited

U.S. PATENT DOCUMENTS

| 2,561,232 | 7/1951 | Rudel et al. | 560/190 |
| 3,231,587 | 1/1966 | Rense | 560/190 |
| 3,381,022 | 4/1968 | LeSuer | 560/190 |
| 4,039,560 | 8/1977 | Tomoshige | 560/190 |
| 4,184,993 | 1/1980 | Singh et al. | 560/190 |

FOREIGN PATENT DOCUMENTS 2241057 3/1973 Fed. Rep. of Germany ...... 560/190

Primary Examiner—Natalie Trousof
Assistant Examiner—Vera C. Clarke
Attorney, Agent, or Firm—William P. Heath, Jr.; Daniel B. Reece, III

[57] ABSTRACT

Emulsifiable polyolefin waxes are prepared by reacting low molecular weight homo- and copolymers containing at least one alpha-olefin monomer having at least three carbon atoms with diesters of maleic acid in the presence of a free radical source. These emulsifiable polyolefin waxes having a Gardner color of less than two form excellent nonionic emulsions which are useful in low color floor polishes.

5 Claims, No Drawings

EMULSIFIABLE MODIFIED POLYMERS

This is a continuation of application Ser. No. 820,958 filed Aug. 1, 1977, now abandoned.

This invention relates to modified poly-alpha-olefin polymers having improved physical properties and the process for preparation thereof. One of the aspects of this invention concerns a novel process for preparing emulsifiable low molecular weight poly-alpha-olefin compositions. Another aspect of this invention concerns the novel reaction product prepared by reacting low molecular weight poly-alpha-olefins and diesters of maleic acid in the presence of a free radical source.

It is known in the art to react low molecular weight poly-alpha-olefins such as polypropylene with polycarboxylic compounds such as maleic anhydride to prepare emulsifiable waxes. These waxes are useful components of floor polishes and, in particular, impart outstanding slip resistance to floor polish films. However, these emulsifiable polypropylene waxes prepared by reacting maleic anhydride with a low molecular weight polypropylene in the presence of a peroxide catalyst have the disadvantage of being colored. For example, one such maleic anhydride modified polypropylene wax having an acid number of 45 has a melt Gardner color of from 8 to 13. This color has prevented widespread use of such emulsifiable waxes in floor polishes where clarity is a requirement.

Accordingly, it is one of the objects of the invention to provide novel emulsifiable poly-alpha-olefin waxes having improved physical properties.

Another object of this invention is to provide poly-alpha-olefin compositions having excellent clarity.

A further object of the invention is to provide an emulsifiable poly-alpha-olefin composition.

Still another object of the invention is to prepare emulsifiable low molecular weight crystallizable poly-alpha-olefin compositions exhibiting high hardness properties.

A still further object of this invention to to improve the emulsifiability of unemulsifiable poly-alpha-olefin compositions by reacting the unemulsifiable poly-alpha-olefin with diesters of maleic acid.

Another object is to provide a process for producing poly-alpha-olefin compounds which have good color and are readily emulsifiable.

A further object is to provide poly-alpha-olefin emulsions which are clear and stable.

Further objects and advantages of the invention will be apparent to those skilled in the art from the accompanying disclosure and claims.

In accordance with this invention, it has been found that low viscosity homopolymers and copolymers of alpha-monoolefins containing at least one alpha-olefin monomer having 3 to 12 carbon atoms can be modified to produce polymers having improved physical and chemical properties by reacting such alpha-olefin polymers with diesters of maleic acid in the presence of a free radical source. These modified polymeric materials are of low molecular weight and are readily emulsifiable in nonionic emulsification systems.

The low viscosity homopolymers and copolymers of alpha-olefins containing at least one alpha-olefin monomer having at least 3 carbon atoms, which can be reacted with diesters of maleic acid in the presence of a free radical source include, for example, low viscosity homopolymers and copolymers containing propylene, butene-1, 4-methyl-1-pentene, 3-methyl-1-butene, 4,4-dimethyl-1-pentene, 3-methylpentene-1, 4-methylhexene-1, 5-ethylhexene-1, 6-methylheptene-1, hexene-1, heptene-1, octene-1, nonene-1, decene-1, dodecene-1, such as polypropylene, polybutene-1, propylene/butene-1 copolymer and the like. Copolymers containing these monomers and ethylene can also be used, such as ethylene-propylene copolymer, ethylene-butene-1 copolymer and the like. Such poly-alpha-olefins can be either crystalline or amorphous, although the crystalline modified poly-alpha-olefins are generally more useful in floor polish applications.

These homopolymeric or copolymeric low viscosity poly-alpha-olefins can be prepared by thermally degrading high molecular weight alpha-olefin polymers prepared by conventional polymerization processes. For example, one such suitable conventional polymer is the highly crystalline polypropylene prepared according to U.S. Pat. No. 2,969,345. Thermal degradation of conventional homopolymers or copolymers is accomplished by heating at elevated temperatures causing the polymer chain to rupture apparently at the points of chain branching of the polymeric material. The degree of degradation is controlled by reaction time and temperature to give a thermally degraded low molecular weight crystallizable polymeric material having a melt viscosity range from about 20–500 cp. at 190° C. (Brookfield viscosity), preferably about 25–200 cp., and most preferably about 25–100 cp. at 190° C. By carefully controlling the time, temperature and agitation, a thermally degraded poly-alpha-olefin of relatively narrower molecular weight range than the starting high molecular weight polymer is obtained. The degradation is carried out at a temperature from 290° C. to about 425° C. These low viscosity poly-alpha-olefins prepared by thermally degrading conventional high molecular weight polymers, such as, for example, polypropylene, are fairly high melting, hard, waxy solids (ring and ball softening points range from 145° to about 156° C.) and are not emulsifiable. Upon reaction with diesters of maleic acid, thereby increasing the saponification number, the thermally degraded polymer becomes emulsifiable.

The low viscosity thermally degraded poly-alpha-olefins are reacted with diesters of maleic acid in the melt phase under an inert atmosphere, such as nitrogen. The reaction is carried out at temperatures above the melting point of the low viscosity polyolefin and generally less than 300° C., preferably from about 150°–250° C., in the presence of free radical sources. Temperatures below 225° C. are preferred because the product wax tends to become more colored when higher temperatures are used. Although the preferred temperature for grafting is about 170° to 200° C., the actual temperature is primarily dependent upon the specific peroxide reactant used. The temperature, peroxide, and reaction time are chosen such that the peroxide decomposition is complete within a reasonable length of time, 0.5 to about 5 hours. For example, when ditertiary butyl peroxide is used a reaction temperature of about 170° C. is convenient. At 170° C., ditertiary butyl peroxide has a half life of about 8 minutes. Generally, decomposition can be considered complete after about eight half-lives. With ditertiary butyl peroxide at 170° C. grafting should be complete after about one hour. If ditertiary butyl peroxide is used at a lower temperature of 150° C. where the half-life is about one hour, the reaction time would have to be much longer, about 8 hours. Thus the peroxide, reaction temperature, and reaction time are all chosen such that the grafting reaction can be completed within a reasonable time.

Suitable diesters of maleic acid are dimethyl maleate, diethyl maleate, dibutyl maleate, dipropyl maleate and the like.

Suitable free radical sources useful in the present invention are, for example, organic peroxides of the general structure R-O-O-R. The peroxides should be good H abstractors, capable of forming polymeric radicals by abstraction of H from the low viscosity polymer molecules. Such peroxides which are good H abstractors for poly-alpha-olefins are, for example, dicumyl peroxide and ditertiary butyl peroxide.

The extent of the reaction of the low viscosity polyolefin and diester of maleic acid is determined by the concentrations of diester and peroxide used in the reaction. Preferably, about 1 to 30 parts per hundred of diester of maleic acid, based on the weight of the low viscosity polyolefin, can be used in the invention. The amount of free radical agent used is generally quite low, being of the order of about 1 to about 6 pph, based on the weight of the low viscosity poly-alpha-olefin. It is preferred for economical reasons to use the smallest amount of diester of maleic acid and peroxide necessary to obtain a wax with good emulsifiability. In one preferred embodiment, the concentration of diester of maleic acid is about 5 to about 10 pph of diester of maleic acid and about 3 to about 6 pph of peroxide such as ditertiary butyl peroxide, based on the weight of the low viscosity poly-alpha-olefin. At these diester and peroxide concentrations, modified polymers, or graft copolymers, with saponification numbers of about 20 to about 50 are obtained, depending on the particular maleate ester grafted. Although it is known in the art to react maleic anhydride with polypropylene to form emulsifiable waxes with high color, it is not obvious that the diesters of maleic anhydride would react to form emulsifiable waxes with low color. In fact, the maleate diester graft waxes of polypropylene would not be expected to be emulsifiable because no acid or anhydride groups are available for neutralization by caustic during emulsification. However, experiments have shown that graft copolymer of maleate diesters and polypropylene can be emulsified under conditions used in the art to prepare emulsions of oxidizable polyolefins, whereas graft copolymers of polypropylene with other classes of esters, such as the acrylate and methacrylates, were not emulsifiable under these same conditions. Also, using polyethylene in place of polypropylene in the present invention provides a white good color reaction product. This polyethylene reaction product, however, is not emulsifiable.

The preparation of graft copolymers of diesters of maleic acid and degraded polypropylene to provide polymeric compositions having both good color and good emulsifiability may be carried out either in a batchwise or in a continuous manner with contact times in the order of about 10 minutes to about 2 hours. These modified low molecular weight poly-alpha-olefin compositions have a saponification number of at least 20, preferably about 30-50.

The saponification number is determined in accordance with ASTM D-1387-59 with the following modifications:
 a. a mixture of 50 ml xylene and 50 ml of n-butanol and 5 ml 0.5 normal alcoholic NaOH is used as the saponification medium instead of 0.1 normal alcoholic NaOH.
 b. after refluxing the sample in the saponification medium for 3 hours, titrate with 0.05 normal sulfuric acid in n-butanol instead of 0.1 normal HCl.

The grafting of the diesters of maleic acid onto the low viscosity poly-alpha-olefin is carried out in an inert atmosphere. An inert atmosphere such as nitrogen prevents oxidation of the poly-alpha-olefin wax and helps to provide a colorless product.

The unreacted diester can be separated from the reaction mixture by purging the reaction mixture with an inert gas while the melt temperature is between 200° and 300° C. After the unreacted diester has been removed, the modified poly-alpha-olefin can be further purified by vacuum stripping or solvent extraction.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 250 grams of highly crystallizable high molecular weight polypropylene having a heptane index of greater than 95%, and an inherent viscosity of about 2.0 was placed in a glass round-bottomed flask. The flask was purged with dry nitrogen to remove air and it was carefully immersed in a Wood's metal bath maintained at 350° C. After the polymer melted, it was stirred and maintained at 350° C. for about 1 hour. The flask was removed from the metal bath. After the polymer had cooled to about 200° C., it was poured from the flask onto a metal tray. On cooling to about ambient temperature, the hard brittle waxy material was easily granulated and had a melt viscosity of about 170 cp. at 190° C. and an inherent viscosity of about 0.42.

Low viscosity polymers were also produced in the above manner from high molecular weight poly-1-butene, poly-1-pentene, poly-1-hexene, poly-4-methyl-1-pentene, poly-1-dodecene, ethylene/propylene copolymers, propylene/butene-1 copolymers, and the like.

EXAMPLE 2

Four hundred grams of degraded polypropylene having a melt viscosity of 170 cp. at 190° C. prepared according to Example 1 was melted under nitrogen in a four-necked, round-bottomed flask and brought up to 200°±5° C. Forty grams of dibutyl maleate and 24 grams of ditertiary butyl peroxide were mixed together in an addition funnel and added dropwise to the polypropylene and well mixed with adequate stirring over a period of 30 minutes. Reaction was continued for an additional 10 minutes to allow time for complete destruction of all the peroxide. Unreacted dibutyl maleate and the volatile decomposition products of the peroxide catalyst were removed by sweeping with nitrogen for about two hours at 200° C. The product was poured up in a silicon treated paper boat and allowed to cool.

The product was a wax with an off-white color in the solid. Molten, the wax was clear and had a Gardner color of +1. The wax had a saponification number of 33.1, a Brookfield viscosity of 87 cp. at 190° C., a ring and ball softening point of 145° C., a penetration hardness of 0.1 mm$^{-1}$, and a density of 0.907 gram per cubic centimeter. The wax formed an excellent, transparent nonionic emulsion in the following manner:

Twenty grams of wax, 6 grams of Igepal CO-530 emulsifier [nonylphenoxy poly(ethyleneoxy)ethanol], 2.0 grams of potassium hydroxide (86% purity), and 100 milliliters of distilled water were placed in a 300 ml. Parr stirred pressure reactor vessel and the vessel was sealed. The vessel was heated to 200° C. and held for 45 minutes. The emulsion was cooled rapidly by passing cold water through a cooling coil inside the pressure vessel. The resulting emulsion was of excellent quality. It was quite transparent (percent transmittance of 80) and formed a film on black glass which had excellent gloss and particle size. When the emulsion was added to standard floor polish formulations, the wax imparted excellent properties to the polish. In particular, the polish has outstanding slip resistance.

EXAMPLE 3

The grafting procedure of Example 1 was repeated except that the diethyl maleate was used in place of dibutyl maleate and the product was nitrogen stripped for one hour at 225° C. instead of two hours at 200° C. as in Example 1. The emulsifiable product formed was an off-white wax with a Gardner color of +1, and was clear in the melt. The wax had a saponification number of 39.6, a Brookfield viscosity of 75 cp. at 190° C. The wax was emulsified by the same procedure as given in Example 1. The emulsion was very clear with a high clarity. The percent transmittance of the emulsion was 81%.

EXAMPLE 4

Eight hundred grams of degraded polypropylene (Brookfield viscosity, 265 at 190° C.) were melted under nitrogen and brought up to 175±5° C. Eighty grams of dimethyl maleate were added and the temperature allowed to readjust to 175° C. and then 48 grams of ditertiary butyl peroxide were added dropwise to the stirred mixture over a period of 30 minutes. A Dean Stark trap was used to condense volatile products from the decomposed peroxide catalyst. After all peroxide was added, stirring was continued for 30 more minutes to allow time for decomposition of all the ditertiary butyl peroxide. The crude product was then nitrogen stripped at 200±5° C. for two hours to remove unreacted monomer. The product wax was clear in the melt, had a Gardner color of 1, a viscosity of 175 cp. at 190° C., and a saponification number of 51.4. The wax was emulsified in a stirred Parr reactor for 45 minutes at 200° C. using 20 grams wax, 6 grams Igepal CO-530 emulsifier, 3.0 grams of potassium hydroxide (86% purity) and 100 ml of distilled water. The emulsion was of poor quality, being cloudy with a percent transmittance of less than 1%. A film on black glass had very poor gloss and poor particle size.

It was completely unexpected, therefore, that the process of the present invention would provide emulsifiable low molecular weight poly-alpha-olefin waxes having low color since reacting low viscosity poly-alpha-olefins with maleic anhydride in the presence of a free radical component, such as a peroxide, produces a highly colored wax.

The modified low molecular weight emulsifiable poly-alpha-olefin waxes of this invention are useful for many purposes including preparing nonionic emulsions which are excellent textile-treating agents which improve the scuff resistance of fabrics such as permanently creased cotton fabrics. The emulsions are also useful in floor polish compositions providing scuff resistant, hard, glossy clear finishes.

The invention has been described in detail with particular reference to certain preferred embodiments thereof, but it will be understood that variations and modifications can be effected within the spirit and scope of the invention.

I claim:

1. An emulsifiable poly-alpha-olefin wax having a saponification number of from 20 to 60, melt viscosity greater than 20 centipoise at 190° C., and a Gardner color of less than 2, prepared by reacting a low viscosity poly-alpha-olefin selected from the group consisting of crystalline polypropylene and crystalline ethylene/propylene copolymer containing about 1.5 weight percent ethylene having a melt viscosity of 20–500 cp. at 190° C. with lower alkyl diester of maleic acid in the presence of a free radical source.

2. An emulsifiable poly-alpha-olefin wax according to claim 1 wherein said low viscosity poly-alpha-olefin is crystalline polypropylene.

3. An emulsifiable poly-alpha-olefin wax according to claim 1 wherein said low viscosity poly-alpha-olefin is a crystalline ethylene/polypropylene copolymer containing about 1.5 weight percent ethylene.

4. An emulsifiable poly-alpha-olefin wax according to claim 2 wherein said wax has a saponification number of about 20.

5. An emulsifiable poly-alpha-olefin wax according to claim 3 wherein said low viscosity poly-alpha-olefin wax has a saponification number of about 20.

* * * * *